US008169626B2

(12) United States Patent
Lofthus et al.

(10) Patent No.: US 8,169,626 B2
(45) Date of Patent: May 1, 2012

(54) USING BUFFERS TO SUPPORT UNCERTAINTIES IN MARKING ENGINE EXECUTION

(75) Inventors: Robert M. Lofthus, Webster, NY (US); Minh Binh Do, Mountain View, CA (US); Rong Zhou, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 876 days.

(21) Appl. No.: 12/201,377

(22) Filed: Aug. 29, 2008

(65) Prior Publication Data

US 2010/0053641 A1 Mar. 4, 2010

(51) Int. Cl.
*G06K 15/00* (2006.01)
*H04N 1/32* (2006.01)
*H04N 1/04* (2006.01)

(52) U.S. Cl. ....... 358/1.12; 358/1.16; 358/468; 358/498

(58) Field of Classification Search ................ 358/1.16, 358/1.17, 400, 444, 426.05, 3.23, 1.18, 1.12, 358/468, 498
See application file for complete search history.

(56) References Cited

U.S. PATENT DOCUMENTS

| | | | | |
|---|---|---|---|---|
| 5,356,127 | A | 10/1994 | Moore et al. | |
| 6,264,188 | B1 | 7/2001 | Taylor et al. | |
| 6,352,255 | B1 | 3/2002 | Taylor | |
| 6,493,098 | B1 * | 12/2002 | Cornell | 358/1.12 |
| 6,567,621 | B2 * | 5/2003 | Miyoshi et al. | 399/19 |
| 6,608,988 | B2 | 8/2003 | Conrow | |
| 6,925,283 | B1 | 8/2005 | Mandel et al. | |
| 6,959,165 | B2 | 10/2005 | Mandel et al. | |
| 6,973,286 | B2 | 12/2005 | Mandel et al. | |
| 7,237,771 | B2 | 7/2007 | Lang et al. | |
| 7,654,512 | B2 * | 2/2010 | Kawata et al. | 270/58.28 |
| 2002/0051669 | A1 * | 5/2002 | Otsuka et al. | 400/619 |
| 2002/0067945 | A1 * | 6/2002 | Kelley et al. | 400/625 |
| 2004/0085561 | A1 | 5/2004 | Fromherz | |
| 2004/0085562 | A1 | 5/2004 | Fromherz | |
| 2004/0088207 | A1 | 5/2004 | Fromherz | |
| 2004/0216002 | A1 | 10/2004 | Fromherz et al. | |
| 2004/0225394 | A1 | 11/2004 | Fromherz et al. | |
| 2005/0203643 | A1 | 9/2005 | Jackson et al. | |
| 2005/0206945 | A1 * | 9/2005 | Kumazawa | 358/1.14 |
| 2005/0240922 | A1 | 10/2005 | Fromherz | |
| 2005/0278050 | A1 | 12/2005 | Ruml et al. | |
| 2005/0278303 | A1 | 12/2005 | Ruml et al. | |
| 2006/0114497 | A1 | 6/2006 | Anderson et al. | |
| 2006/0132815 | A1 | 6/2006 | Lofthus et al. | |
| 2006/0250636 | A1 | 11/2006 | Richards | |
| 2006/0291018 | A1 | 12/2006 | Lang | |

(Continued)

OTHER PUBLICATIONS

U.S. Appl. No. 11/708,298, filed Feb. 20, 2007, Lang.

*Primary Examiner* — Jerome Grant, II
(74) *Attorney, Agent, or Firm* — Fay Sharpe LLP

(57) ABSTRACT

A printing system includes at least one marking engine and a paper path which carries sheets of print media to the marking engine from an upstream direction and carries sheets of print media which have been marked by the marking engine in a downstream direction. A buffer system includes a sheet buffer in the paper path downstream of the marking engine and optionally includes another sheet buffer in the paper path upstream of the marking engine. The buffer system allows variability in the residence time of the marking engine to be accommodated by varying the residence time of sheets in the downstream buffer.

24 Claims, 5 Drawing Sheets

U.S. PATENT DOCUMENTS

2007/0081064 A1 4/2007 Spencer et al.
2007/0120934 A1 5/2007 Lang
2007/0177189 A1 8/2007 German
2008/0073837 A1 3/2008 DeGruchy
2008/0112743 A1 5/2008 Moore
2008/0148257 A1 6/2008 Ruml et al.

* cited by examiner

USING BUFFERS TO SUPPORT UNCERTAINTIES IN MARKING ENGINE EXECUTION

BACKGROUND

The exemplary embodiment relates to a buffering system for accommodating uncertainties in a media processing module, such as a marking engine. It finds particular application in a modular printing system in which various media processing modules are under the control of a common controller and will be described with particular reference thereto. However, it is to be appreciated that the present exemplary embodiment is also amenable to other like applications.

Printing systems, such as copiers, printers, and multifunction devices, generally include at least one marking engine for applying images to sheets of print media using marking materials, such as inks or toners. Modular integrated printing systems have been developed in which various components, such as sheet feeders, conveyors, marking engines, and finishers, are configured as interchangeable modules, allowing the printing system to be reconfigured or components removed for repair or replacement. To ensure that the various components operate in harmony and an optimum throughput is maintained, a central controller oversees the movement of the print media through each of the modules, allowing accurate timing of the print media. Model-based planning may be used to create machine control plans. This control method relies on the capability of each component of the system to send a model of its behavior to the central controller. The central controller interprets the models to determine the capabilities and constraints of the system components. When a print job is received for processing, the controller generates a plan to process one or more print jobs based on the components' capabilities and capability constraints described within each of the component models. The plan may then be confirmed by each component of the system to ensure that each component can execute its portion of the plan.

It would be advantageous to be able to incorporate, into such a modular printing system, one or more marking engines which have not been specifically designed to function entirely under the control of a central controller. One reason for this is to provide functionality not available in the modular marking engines, such as high speed printing. Another reason is to allow greater flexibility to a print shop in the way in which existing equipment is utilized. Marking engines which are not designed to operate in an integrated printing system have their own control unit, which controls the movement of the print media through the marking engine. Such control units are not programmed to provide detailed information on the capabilities and constraints of the marking engine to an external controller. Additionally, the marking engine control unit may determine when the device should go down for a short period to perform internal checks. This can result in uncertainties in the timing of the sheets, at least as far as the central controller is concerned.

Sheet buffers have been developed to temporarily hold or delay the transport of individual sheets in order to provide additional time for downstream processing to be performed. Such temporary holding or delaying of sheets is generally referred to as "buffering" and has been accomplished in many different ways. One method of buffering has been to temporarily slow or stop a roll nip or other paper transport for a period of time equal to the inter-copy-gap between successive sheets. If longer times are required, other systems may be used. For example, multi-sheet buffers have been developed to allow several sheets to accumulate. However, such buffers do not accommodate uncertainties in the timing of a marking engine.

INCORPORATION BY REFERENCE

The following references, the disclosures of which are incorporated herein in their entireties by reference, are mentioned.

U.S. Pat. No. 6,608,988, issued Aug. 19, 2003, entitled CONSTANT INVERTER SPEED TIMING METHOD AND APPARATUS FOR DUPLEX SHEETS IN A TANDEM PRINTER, by Brian R. Conrow, discloses a method and apparatus for duplex imaging in a tandem print engine system by imaging a first side of a sheet in a first marking, inverting the sheet, and imaging a second side of the sheet in a second marking module in the system one pitch after N revolutions of a photoreceptor following the first side imaging.

U.S. Pub. No. 2006/0291018, published Dec. 28, 2006, entitled MIXED OUTPUT PRINT CONTROL METHOD AND SYSTEM, by Joseph H. Lang, and U.S. application Ser. No. 11/708,298, filed Feb. 20, 2007, entitled EFFICIENT CROSS-STREAM PRINTING SYSTEM, by Joseph H. Lang, disclose a merging module which connects two print engines at approximately 90 degrees to one another. The merging module of the 2006/0291018 publication includes a sheet rotator in a plane that is common to the paper paths of both print engines and a buffer which stores printed sheets. The module also includes two bypass paths, one above and one below the rotator, to route the two paper paths around the rotator and enable both print engines to deliver their output to the appropriate finishing device as well as to the buffer.

U.S. Pat. No. 6,973,286, issued Dec. 6, 2005, entitled HIGH RATE PRINT MERGING AND FINISHING SYSTEM FOR PARALLEL PRINTING, by Mandel, et al., discloses a system for printing media which includes a plurality of marking engines for outputting printed media in a stream, a media path system operable to transport the printed media from the marking engines to one or more finishing stations such that the streams are merged and transported one on top of the other, and one or more finishing stations capable of compiling media in groups of two or more sheets for post processing the printed media into one or more completed jobs.

U.S. Pub. No. 2008/0073837, published Mar. 27, 2008, entitled SHEET BUFFERING SYSTEM, by Paul J. DeGruchy, discloses a sheet buffer for a printing device having a plurality of nip pairs for selectively receiving and releasing a plurality of printer sheets. Each subsequent sheet is shingled over a previous sheet. The individual sheets can be successively unloaded in a first-in-first-out order.

U.S. Pub. No. 2008/0148257, published Jun. 19, 2008, entitled EXCEPTION HANDLING, by Ruml, et al., discloses a system that re-plans jobs in response to system component errors. The system includes an exception handler that receives an exception from one of a plurality of components executing a plan to process a job. The system further includes a planner that creates a new plan for the job based on a model-based planning technique and user preferences.

U.S. Pub. Nos. 2005/0278303; 2005/0278050; 2005/0240922; 2005/0203643; 2004/0225394; 2004/0216002; 2004/0088207; 2004/0085562; 2004/0085561 all generally relate to scheduling of print jobs.

BRIEF DESCRIPTION

In accordance with one aspect of the exemplary embodiment, a printing system includes a marking engine. A paper path carries sheets of print media to the marking engine from an upstream direction and carries sheets of print media which have been marked by the marking engine in a downstream direction. A buffer system optionally includes a first sheet buffer in the paper path upstream of the marking engine. The buffer system includes a second sheet buffer in the paper path downstream of the marking engine.

In another aspect, a method of printing includes transporting sheets of print media on a paper path to a marking engine, marking the sheets in the marking engine, outputting the marked sheets from the marking engine to a sheet buffer in the paper path downstream of the marking engine, and controlling a residence time of each sheet in the sheet buffer to absorb variability in a residence time of the sheet in the marking engine.

In another aspect, a printing system includes a marking engine having a residence time with a known variability. A paper path carries sheets of print media to the marking engine from an upstream direction and carries sheets of print media which have been marked by the marking engine in a downstream direction to a sheet buffer in the paper path downstream of the marking engine. A buffer control unit controls the sheet buffer whereby a residence time of each sheet in the sheet buffer is controlled to absorb the variability in the residence time of the sheet in the marking engine.

DETAILED DESCRIPTION

Figure 1:
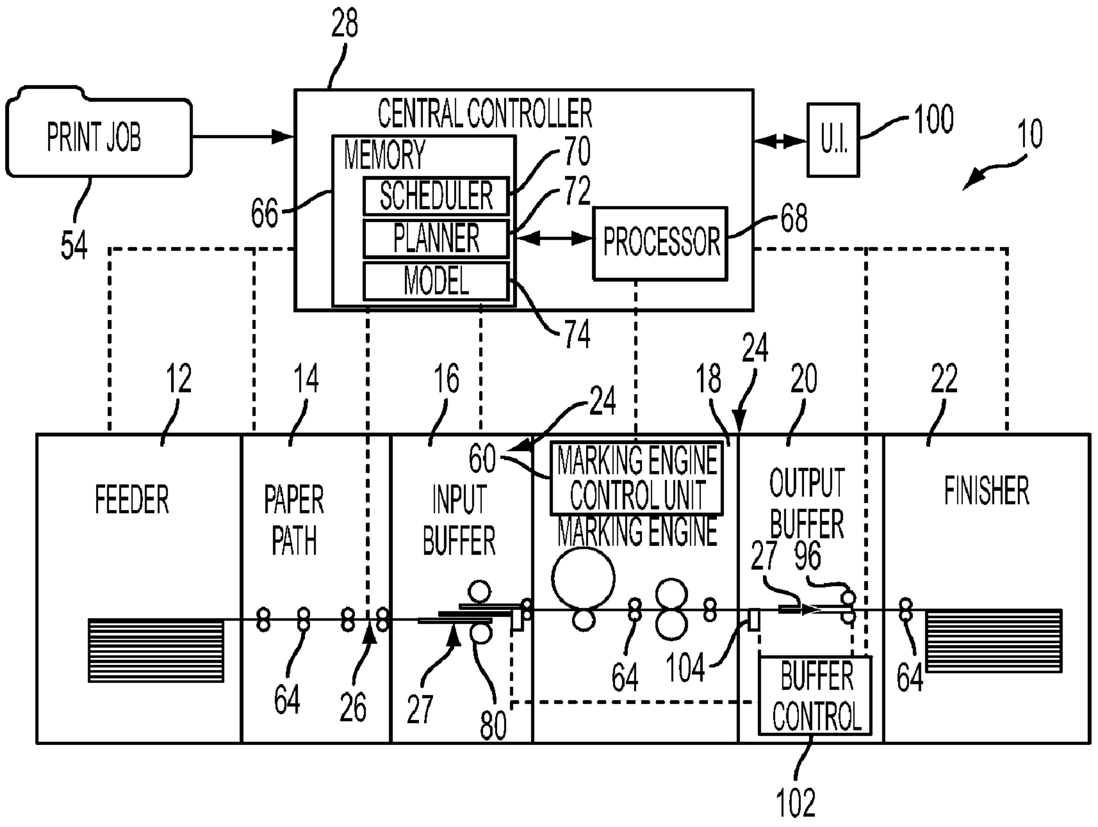
FIG. 1 is a schematic side elevational view of a printing system including a sheet buffering system in accordance with a first aspect of the exemplary embodiment.

Aspects of the exemplary embodiment relate to a printing system including one or more marking engines and to a method of printing which accommodate uncertainties in the execution of the marking engine(s). In various aspects, the printing system includes a buffer system which accommodates uncertainties in both the input and the output of the marking engine(s).

The printing system of the exemplary embodiment can be a printer, copier, or multifunction device and may incorporate many of the features of printing systems employing one or multiple marking engines as disclosed, for example, in U.S. Pat. No. 6,925,283 and U.S. Pub. Nos. 2006/0114497; 2006/0250636; 2006/0132815; 2007/0081064; 2007/0120934; 2007/0177189; 2008/0112743; 2008/0073837; the disclosures of which are incorporated herein in their entireties by reference. For example, the exemplary printing system may include two (or more) marking engines, where each of the marking engines may be of the same mode, such as monochrome (single color, e.g., black), color (multi-color) or magnetic ink character recognition (MICR). Or, the printing system may be mixed mode, e.g., one color and one monochrome marking engine or other combination of different marking engines. In other embodiments, a single marking engine is employed.

The printing system executes print jobs. A print job is normally a set of related sheets, usually one or more collated copy sets copied from a set of original print job sheets or electronic document page images, from a particular user, or otherwise related. An image generally may include information in electronic form which is to be rendered on the print media by the marking engine and may include text, graphics, pictures, and the like. The operation of applying images to print media, for example, graphics, text, photographs, etc., is generally referred to herein as printing or marking.

The exemplary printing system may be configured as a plurality of interconnected media processing modules. In this embodiment, components of the printing system, such as marking engines, paper sources, buffers, merge module(s), finishers, and interconnecting media paths, are configured as separate, removable, and interchangeable media processing modules. Each module may be housed by a respective housing, which may be supported on wheels, rollers, or other transport members for manipulating the module across a floor surface. The components can be arranged in various arrangements, including linear, stacked, orthogonal, and the like. An advantage of such a modular printing system is that it can be reconfigured, e.g., by adding, removing, or exchanging modules, to accommodate the changing demands of a printing business or for replacement and/or repair of components.

In the exemplary embodiment, the components of the printing system are under the control of a central controller. At least one of the marking engines has uncertainties in behavior which are of the type which cannot be fully predicted by the central controller. The buffering system absorbs these uncertainties, allowing the entire printing system to function effectively as an integrated printing system.

With reference to FIG. 1, a schematic block diagram of a first embodiment of a printing system 10 according to the exemplary embodiment is illustrated. The printing system 10 includes a set of media processing modules in sequence, including a paper feeder 12, a paper path module 14, a first sheet buffer 16, a marking engine 18, a second sheet buffer 20, and a finisher 22. The first and second sheet buffers 16, 20, serve as input and output buffers, respectively, of a buffering system 24 for the marking engine 18. The first sheet buffer 16 may be located directly upstream of the marking engine, i.e., there are no print media processing modules intermediate the sheet buffer 16 and the marking engine 18. The second sheet buffer 20 may be located directly downstream of the marking engine 18, i.e., there are no sheet processing modules intermediate the marking engine 18 and the sheet buffer 20. A media conveyor system 26 conveys print media, such as sheets of paper 27, from the feeder 12 along a paper path through the modules 14, 16, 18, 20, and ultimately to the finisher 22. Each of the modules 14, 16, 18, 20, 22 may be housed in a separate housing which houses a portion of the paper path. The various modules 12, 14, 16, 18, 20, 22, and conveyor system 26 are in communication with and/or under the control of a central controller 28.

Figure 2:
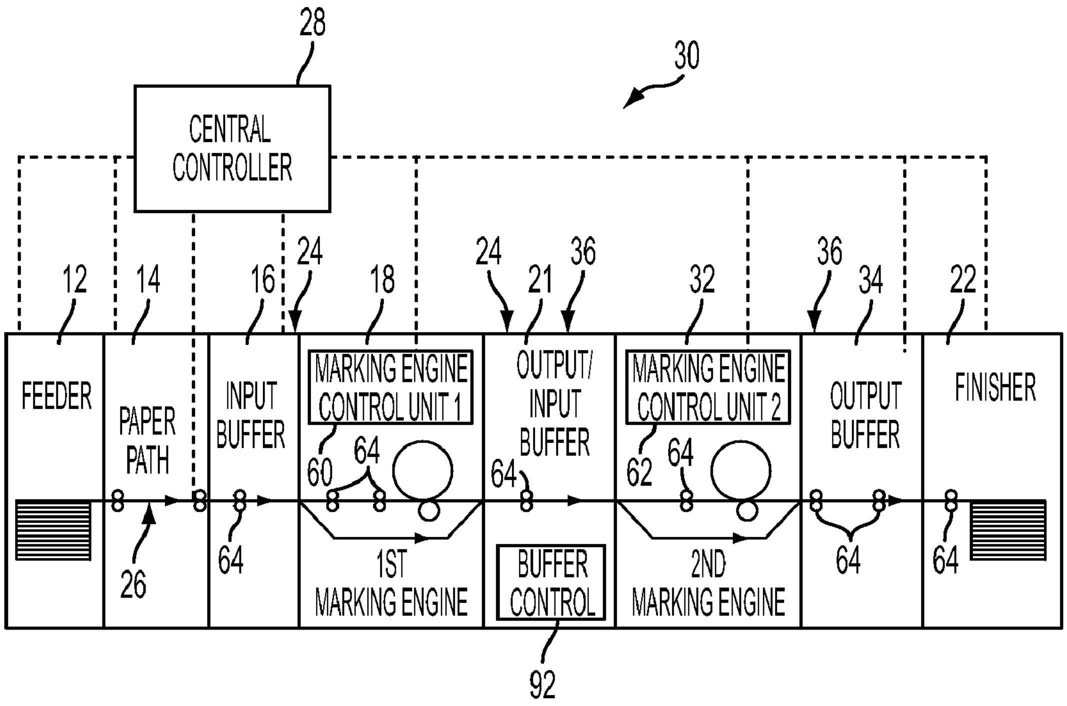
FIG. 2 is a schematic side elevational view of a printing system including a sheet buffering system in accordance with a second aspect of the exemplary embodiment.

With reference to FIG. 2, a block diagram of a second embodiment of a printing system 30 according to the exemplary embodiment is illustrated, where similar components are accorded the same numerals and different components are accorded new numerals. The printing system 30 may be configured as for printing system 10, except as otherwise noted. The printing system 30 includes, in sequence, a paper feeder 12, a paper path module 14, a first sheet buffer 16, a first marking engine 18, a second sheet buffer 21, a second marking engine 32, a third sheet buffer 34, and a finisher 22. The first and second sheet buffers 16, 21, serve as input and output buffers, respectively, of a first buffer system 24 for the marking engine 18. The second and third sheet buffers 21, 34 serve as input and output buffers, respectively, of a second buffer system 36 for the second marking engine 32. Sheet buffer 21 can be configured as a combination of the functions of sheet buffers 20, 16 of FIG. 1. Sheet buffer 34 can be configured analogously to sheet buffer 20 of FIG. 1. A media conveyor system 26 conveys print media from the feeder 12 along a paper path through the modules 14, 16, 18, 21, 32, 34, and ultimately to the finisher 22. The various modules 12, 14, 16, 18, 21, 32, 34, 22, and conveyor system 26 are in communication with and/or under the control of a central controller 28.

While the embodiment of FIG. 2 illustrates a single sheet buffer 21 intermediate the first and second marking engines, which serves as both an output buffer for the first marking engine 18 and an input buffer for the second marking engine 32, in another embodiment, each marking engine 18, 32 may have a dedicated input and output buffer, i.e., two sheet buffers intermediate the first and second marking engines 18, 32.

Figure 3:
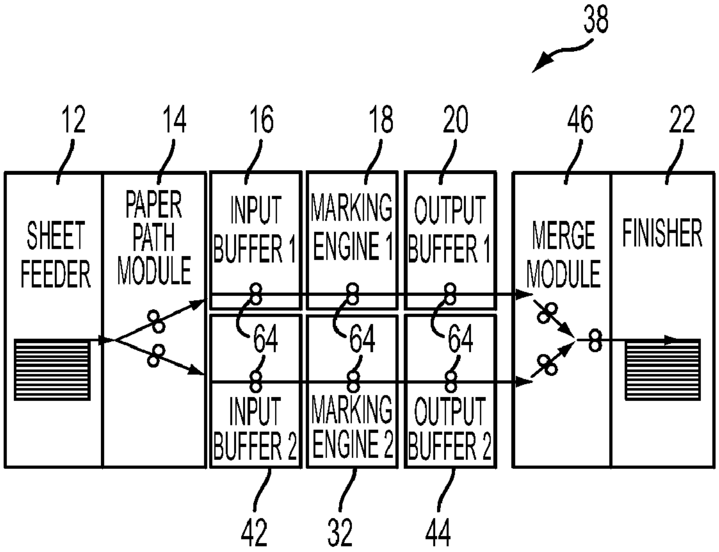
FIG. 3 is a schematic side elevational view of a printing system including a sheet buffering system in accordance with a third aspect of the exemplary embodiment.
Figure 4:
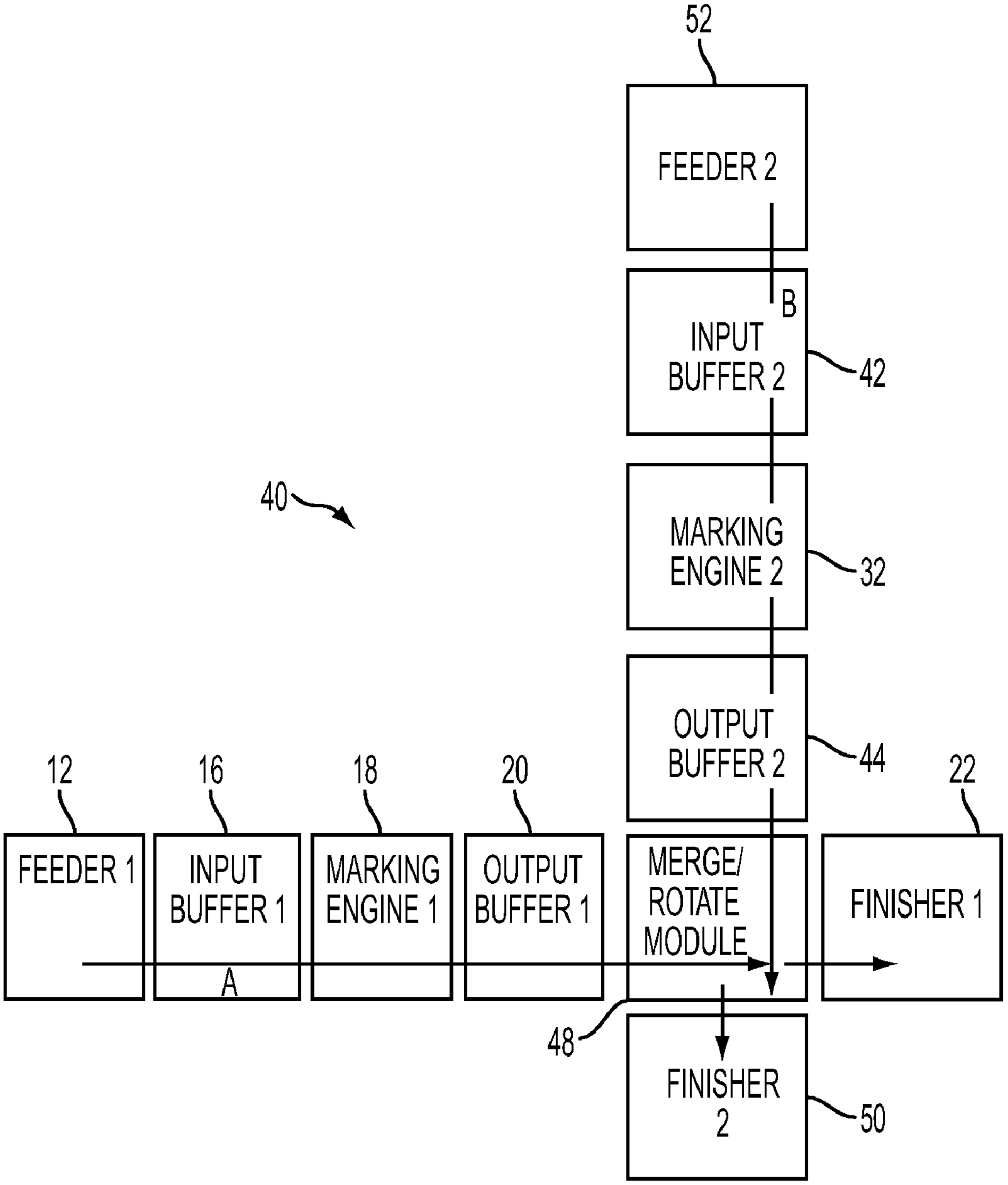
FIG. 4 is a top plan view of a printing system including a sheet buffering system in accordance with a fourth aspect of the exemplary embodiment.

Additionally, while FIG. 2 illustrates a serial printing system 30, other multi-engine systems are also contemplated. For example, the exemplary buffer system 24 or 36 may be incorporated into a parallel printing system in which the printed sheets from two (or more) marking engines 18, 32 are merged into a common stream downstream of the respective output sheet buffers. Exemplary printing systems 38, 40 of this type are illustrated schematically in FIGS. 3 and 4, where similar elements are accorded the same numbers and new elements are accorded new numerals. In FIG. 3, first and second marking engines 18, 32 are arranged in a vertically stacked arrangement with input and outputs sheet buffers 16, 20 and 42, 44, respectively. The sheets from marking engines 18 and 32 are merged into a single stream in a merge module 46. In FIG. 4, a merge/rotate module 48 allows sheets from two orthogonal paper paths A, B to be merged and directed to one of two finishers 22, 50, as described, for example, in copending U.S. application Ser. No. 11/708,298 and U.S. Pub. No. 2006/0291018, incorporated herein by reference. In this embodiment, a second feeder 52 feeds the second marking engine 32 with paper.

The components of the printing system will now be described with particular reference to the printing system 10 of FIG. 1, bearing in mind that the components of the systems of FIGS. 2-4 may be similarly configured.

The exemplary marking engine(s) 18, 32 can be any suitable type for applying images to print media 27, such as xerographic, inkjet, or thermal printing devices. In general, a marking material, such as ink or toner, is applied to the sheet 27 to reproduce image data of an incoming print job 54 (FIG. 1). In the case of a xerographic marking engine, for example, a photoreceptor in the form of a belt or drum is charged to a uniform potential, selectively discharged to create a latent image, and then the latent image is developed by applying toner particles of a selected color or colors. The toner image thus formed is transferred to the print media 27 and fused thereto with a fuser using heat and/or pressure. The exemplary marking engines 18, 32 can be single color (monochrome) or multi-color (color) devices and may be configured for simplex (one sided) and/or duplex (two sided) printing of sheets. Where two (or more) marking engines 18, 32 are included in the printing system, the marking engines may have different processing speeds or other different capabilities, such as color and monochrome.

The exemplary marking engines 18, 32 each include a respective marking engine control unit 60, 62 in communication with the central controller 28, and can further include an input/output interface, a memory, a marking cartridge platform, a marking driver, a function switch, and a self-diagnostic unit, all of which can be interconnected by a data/control bus.

The finisher 22 can be, for example, any post-printing accessory device, such as a paper stacker, stapler, binder, sorter, inserter, collator, hole puncher, folder, envelope stuffer, combination thereof, or the like, and may include single or multiple output trays. The printing system may include one or more finishers, each capable of compiling media in groups of two or more sheets for post processing the printed media into one or more completed print jobs.

The conveyor system 26 generally includes guide baffles, positioned above and below the paper path, which guide the paper 27 along the path, and independently controllable drive members 64, such as pairs of rollers, one or both of which are driven to move the sheets along the path. Other drive members may be airjets, spherical nips, or the like. The print media conveyor system 26 is controllable to acquire sheets 27 of a selected print medium from the print feeder 12, transfer each acquired sheet to the marking engine 18, 32 to perform selected marking tasks, and then transfer each sheet to the finisher 22, 50 to perform finishing tasks.

The central controller 28 may be embodied in hardware, software, or a combination thereof. In one embodiment, the central controller 28 is hosted by one or more dedicated computing systems, such as the digital front end (DFE) of the printing system. Alternatively, the controller 28 may be resident remote from the printing system, such as on a network server (not shown) which is connected by a wired or wireless network to the printing system. The illustrated central controller 28 comprises memory 66 which stores software instructions and a processor 68, in communication with the memory 66, e.g., via a bus, which executes the instructions.

The processor 68 may be a CPU resident on the printer's DFE or may be in the form of one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like.

The memory 66 may be any type of computer readable medium such as random access memory (RAM), read only memory (ROM), magnetic disk or tape, optical disk, flash memory, or holographic memory. In one embodiment, the memory 66 comprises a combination of random access memory and read only memory. In some embodiments, the processor 68 and memory 66 may be combined in a single chip. Memory 66 may store instructions for performing the exemplary method as well as the print jobs awaiting printing.

As illustrated in FIG. 1, the central controller 28 optionally includes a scheduler 70 and a planner 72, which may be separate components, as illustrated, or combined as a scheduler/planner. The scheduler 70 can alternatively reside outside of the central controller 28, as a separated component to preprocess the input print-job 54 before it is sent to the central controller. The scheduler 70 performs the high level scheduling of incoming print job 54, including determining the order in which pages which belong to different concurrently printing jobs 54 will be printed. The planner 72 plans the detailed execution of sheets in the jobs, including the timing of each sheet as it passes through the printing system 10. Apart from the marking engine(s) 18, (and 32 in the case of FIG. 2), the other processing components of the system 12, 14, 16, 20, 22 each provide the central controller 28 with a detailed model of the respective module's constraints and capabilities. In one embodiment, the marking engines 18, 32 may also provide some model of their capabilities and constraints to the planner 72, but may not provide all the details needed by the planner to totally control the marking engines' behaviors. In another embodiment, the model of each component's capabilities and constraints may not come directly from the components themselves but can be specified and embedded into the central controller 28 or in a location accessible to the central controller.

The central controller 28 interprets the models to determine the capabilities and constraints of the system components and incorporates this information into an overall model of the machine 74. Subsequently, the planner 72 plans the processing of the print job 54, based on the components' capabilities and constraints described within each of the component models and whatever basic information is provided by the marking engines 18, 32. In planning the movement of each sheet through the system, the planner factors in a predetermined combined residence time for the sheet to spend in the marking engine 18 and sheet buffer 20, as described in greater detail below. In general, the planner 72 plans only a few sheets ahead of printing, so that it can respond to exceptions, such as a component going off line, or changes in speed of components. The plan may then be confirmed by some or all of the components of the system to ensure that each component can execute its portion of the plan. Even though the marking engines 18, 32 may not confirm their part of the plan, the central controller 28 is able to accommodate these uncertainties.

The exemplary marking engine(s) 18, 32, exhibit uncertainties in behavior which cannot be fully controlled and/or predicted by the central controller 28. For example, the marking engine 18 may have a nominal speed of 60 prints per minute (ppm) over a period of time, such as at least the time taken for 20 prints. This averages to 1 print per second, i.e., a nominal print time $t_1$ of 1 second. However, due to the uncertainty, the marking engine 18 may exhibit variability from the nominal print time $t_1$, by an uncertainty of $\pm t_2$. For example, $t_2$ may be at least 5% and can be up to 10 or 20% of the nominal print time, e.g., up to 0.2 seconds. The actual print time ($t_1 \pm t_2$) can thus range from 0.8-1.2 seconds during normal printing. There may be various causes for these uncertainties, depending on the type of marking engine used. For example, in the case of a xerographic marking engine which utilizes a photoreceptor belt, the marking engine control unit 60, 62 may avoid positioning sheets on the seam.

For convenience $t_2$ may be computed by studying the behavior of the marking engine 18, 32 over a period of time and assigning $t_2$ a value equivalent to, for example, 2 standard deviations from the mean print time or other suitable method which is representative of normal behavior.

Additionally, the marking engine 18, 32 may periodically go off line (stop printing) for short periods, for example, to perform internal calibrations. The marking engine may notify the central controller 28 that it is going offline for a nominal time period $t_3$, e.g., 30 seconds. Once again, there may be uncertainty in the time, such that the actual offline period may be $t_3 \pm t_4$. For example, $t_4$ may be 0.2 seconds.

The exemplary buffer system 24 includes two sheet buffers 16, 20 which serve separate functions in absorbing uncertainties in the marking engine 18 that is intermediate the two sheet buffers. The input sheet buffer 16, upstream of the marking engine 18, serves to absorb uncertainties on the input side of the marking engine 18. For example, if the marking engine 18 determines that it needs to go offline to perform calibration, one or more sheets on their way to the marking engine 18 are held in the sheet buffer 16, until the marking engine 18 resumes printing. This prevents sheets from crashing into the marking engine 18. The capacity of the sheet buffer 16 can be selected to accommodate the maximum number of sheets that can be placed between the feeder 12 and the marking engine entrance. For example, the sheet buffer 16 may be a multi-sheet buffer which can accommodate, for example, a maximum of 5, 10, or 30 sheets.

Figure 5:
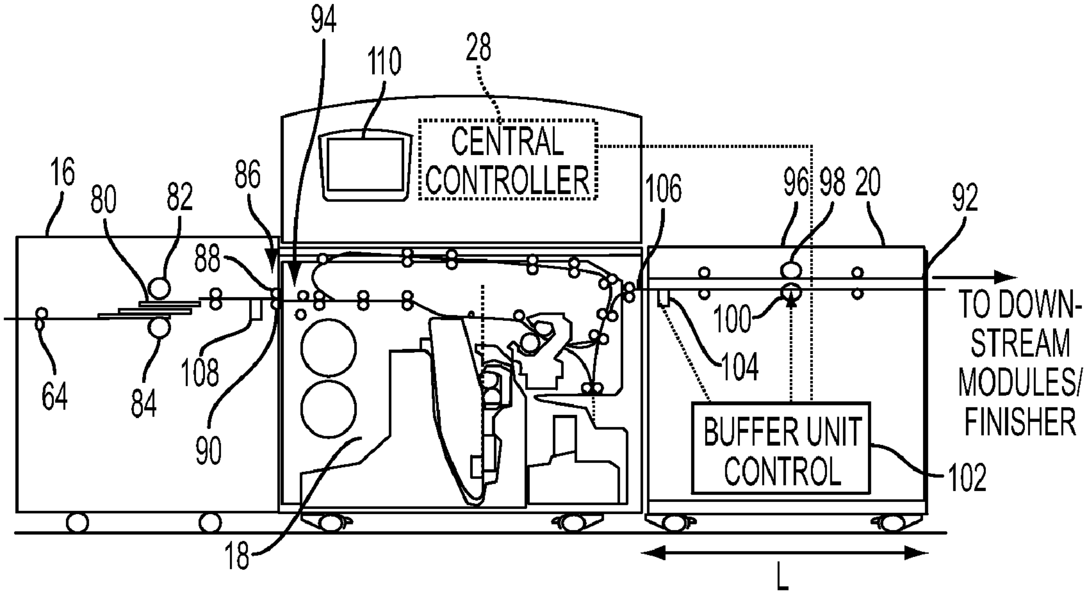
FIG. 5 is side elevational view of the sheet buffering system and marking engine of FIG. 1.

As illustrated in FIG. 5, the sheet buffer 16 may be a first-in-first-out (FIFO) buffer, in which the sheets are shingled one on top of the other, as described, for example, in U.S. Pub. No. 2008/0073837, incorporated by reference. Such a sheet allows one or more sheets to be stopped in the sheet buffer 16 and held in a pinch nip 80, formed between a pair of rollers 82, 84 and then incrementally transferred downstream into an input nip 86 of the marking engine 18 which is formed by a pair of spaced rolls 88, 90. The sheet buffer 16 can include support and guide baffles (not shown) to confine the sheets 27 moving along the paper path and direct them from one nip to the next. Other multi-sheet buffers which may be utilized store the sheets in separate trays, as disclosed for example, in U.S. application Ser. No. 11/708,298. The disclosures of each of these references are incorporated herein in their entireties by reference. Other sheet buffer systems may incorporate stack feeders, e.g., air knife stack feeders, as disclosed, for example, in U.S. Pat. Nos. 6,352,255, 6,264,188, 5,356,127, and 7,237,771.

The second buffer 20 serves to absorb uncertainties in the marking engine's printing time. In particular, the sheet buffer 20 operates to output each sheet at its output end 92 at a fixed residence time $t_5$ after the sheet has entered an input end 94 of the marking engine. A suitable value for $t_5$ can be computed as the sum of $t_1$, $t_2$, and $t_6$, where $t_6$ is the minimum residence time of a sheet in the sheet buffer 20. $t_6$ is a function of the path length L of the sheet buffer and the speed of the drive members. For example, $t_5 \geqq t_1+t_2+t_6$. In general, $t_5$ does not exceed the sum of $t_1+t_2+t_6$ by more than about 1 second, to avoid unnecessarily delaying the output of the print job.

For example, if $t_1$ is 1 second, $t_2$ is 0.2 seconds and $t_6$ is 0.5 seconds, then $t_5$ may be, at a minimum, 1.7 seconds, and could be up to about 2 or 3 seconds.

The second buffer 20 may be configured to accommodate a maximum of one sheet. In the exemplary embodiment, the sheet buffer 20 includes a pinch nip 96 formed by a pair of rollers 98, 100, which can be moved together to grip the sheet and then moved apart to release it. To allow the sheet buffer 20 to variably control the residence time in the sheet buffer, a buffer control unit 102 is provided, in communication with the pinch nip, which may be located within the sheet buffer or remote therefrom. The buffer control unit 102 controls one or both rollers to adjust the gap between the rollers 98, 100.

In the exemplary embodiment, a paper sensor 104, such as an optical sensor or a motion sensor, is positioned adjacent the paper path at the output end 106 of the marking engine 18. The sensor 104 detects the leading edge of a sheet of print media as it exits the marking engine 18. The sensor communicates the time $t_7$ at which this occurs to the buffer control unit 102, which computes the delay time $t_8$ for the sheet so that it is output on schedule at the time interval $t_5$. In one embodiment, the buffer control unit 102 receives the predicted input time $t_0$ to the marking engine from the central controller 28. In another embodiment, a second sensor 108, at the input end of the marking engine 18, detects the leading edge of the sheet 27 as it enters the marking engine 18 and provides this as an actual $t_0$ time to the buffer control unit 102.

The delay time $t_8$ in seconds, can then be computed as $t_5-(t_7-t_0)-t_6$. The buffer control unit 102 causes the pinch nip to hold the sheet for the computed delay time, so that it exits at $t_5$.

In another way of computing the delay time, the buffer control unit 102 may be provided with the exit time $t_8$ at which the sheet is scheduled to exit from the buffer 20, e.g., by the central controller 28. The buffer control unit then computes the delay time as $t_8-t_6-t_7$. In this embodiment, the second sensor 108 is not needed.

Other ways of computing the delay time are also contemplated which achieve the same result, i.e., a consistent output from the sheet buffer at a predictable time which is independent of the length of time that the marking engine 18 takes to print the sheet. The planner 72 can use this predictable output time (or the combined residence time $t_5$) to plan sheet processing operations downstream of the output sheet buffer 20.

The buffer control unit 102 can be implemented in hardware or software or a combination thereof, as described for the central controller 28. The buffer control unit 102 may be resident in the output buffer 20, as shown, or another part of the printing system 10, such as in the digital front end or on a network server connected with the printing system by wired or wireless links. In one embodiment, a user interface 110 (FIG. 5), such as a touch screen, keyboard, or the like, is provided. The user interface 110 is in communication with the buffer control unit 102, either directly or through the central controller 28. A user can input a selected fixed residence time $t_5$, e.g., from a set of residence time options (such as 1.7 sec, 2.0 sec, 2.2 sec, etc.), or some other value from which this can be determined.

As will be appreciated, the productivity of the printing system 10 is not affected by the delay time. The productivity can be expressed by the formula:

$$\text{ppm}=(\text{last\_sheet\_out}-\text{first\_sheet\_out})/(\text{No. of sheets}-1)\times 60$$

For example, assume that a 10 sheet job is to be printed, the marking engine prints at a nominal 60 ppm and the residence time in the buffer 20 is about 0.7 seconds, then the time the last sheet is out of the system without the second buffer 20 is (10+x), where x is the time taken to reach the finisher and with buffer 20 is (10+x+0.7)=10.7+x. Using the above equation, then there is no difference in ppm between the machines with or without buffers. Both of them run at 60 ppm. The slightly longer print time (0.7 seconds longer in this example) is generally of no consequence, particularly on a large job in which hundreds of pages are printed.

More generally, if the marking engine 18 has a nominal (average) print speed of p prints per minute (e.g., 60 ppm) and a uncertainty of $\pm q/p$, then the buffer control unit 102 maintains an output of printed sheets at the downstream end 92 of the second sheet buffer 20 of p prints per minute with an uncertainty (determined in the same manner as for the marking engine) which is substantially less than $\pm q/p$, e.g., $\leqq\pm 0.5\ q/p$, and in one embodiment $\leqq\pm 0.2\ q/p$, or $\leqq\pm 0.1\ q/p$.

The printing system 10 executes print jobs. Print job execution involves printing images, such as selected text, line graphics, photographs, magnetic ink character recognition (MICR) notation, and the like on front, back, or front and back sides or pages of one or more sheets of paper or other print media. Some sheets may be left completely blank. Some sheets may have both color and monochrome images. Execution of the print job may also involve collating the sheets in a certain order. Still further, the print job may include folding, stapling, punching holes into, or otherwise physically manipulating or binding the sheets. The printing, finishing, paper handing, and other processing operations that can be executed by the printing system 10 are determined by the capabilities of the paper source 12, marking engine(s) 18, 30, and finisher(s) 22 of the printing system 10. These capabilities may increase/decrease over time due to addition of new components, upgrading of existing components, etc.

The printing system 10 is an illustrative example. In general, any number of print media sources, marking engines, finishers or other processing units can be connected together by a suitable print media conveyor configuration.

Figure 6:
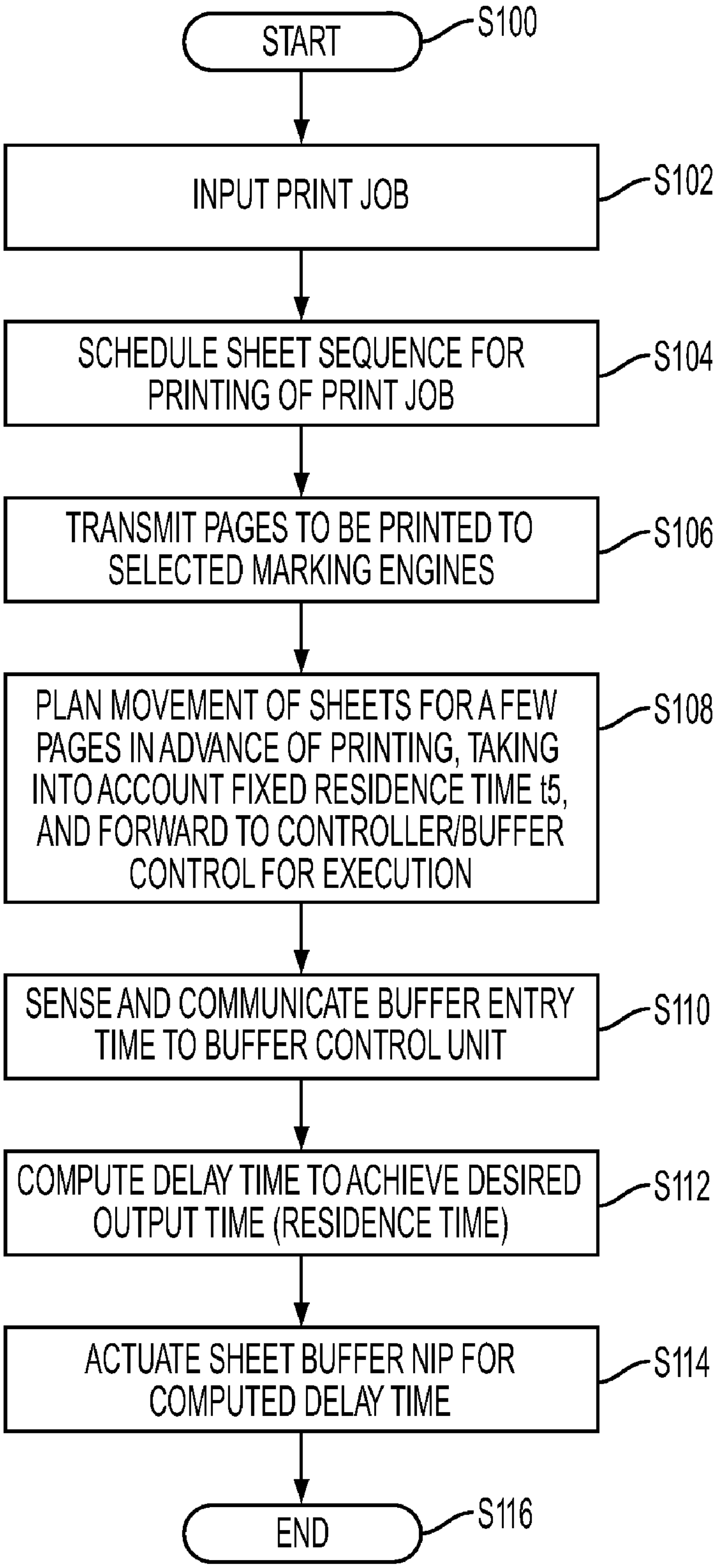
FIG. 6 illustrates an exemplary printing method in accordance with another aspect of the exemplary embodiment.

FIG. 6 illustrates an exemplary printing method which may be performed with the printing systems disclosed. The method begins at S100.

At S102, a print job is received.

At S104, the scheduler may schedule a sequence of printing of the sheets of the print job (or more than one job, when two or more jobs are to be printed concurrently).

At S106 pages of the print job in appropriate form for rendering are sent to the marking engine or engines scheduled for printing the print job.

At S108, the planner plans the timing of at least a few pages of the print job, taking into account the total fixed residence time of sheets in the marking engine and buffer.

At S110, the planner sends the planning information generated at S108, including the exit time $t_8$ (or alternatively the scheduled entry time $t_0$) for each sheet to the controller and/or buffer control unit 102.

At S112, when a sheet is output from the marking engine, the buffer control unit receives the output time from sensor 104 (or alternatively the sensed or scheduled input time $t_0$) and computes a delay time.

At S114, the buffer control unit actuates the sheet buffer nip 96 to effectuate the determined delay time.

The method ends at S116.

The method illustrated in FIG. 6 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:

a marking engine;

a paper path which carries sheets of print media to the marking engine from an upstream direction and carries sheets of print media which have been marked by the marking engine in a downstream direction;

a buffer system comprising:

a first sheet buffer in the paper path upstream of the marking engine; and a second sheet buffer in the paper path downstream of the marking engine, at least one sheet feeder, at least one conveyor system, and at least one finisher, the sheet feeder, conveyor system, and finisher all being under the control of a central controller;

the conveyor system conveying the sheets of print media from the sheet feeder along the paper path to the marking engine via the first sheet buffer, and from the marking engine to the finisher via the second sheet buffer, the central controller receiving timing information from at least one of the sheet feeder, conveyor system, and finisher whereby the central controller times the movement of each sheet through the printing system, the controller timing the movement of the sheets through the marking engine based on a fixed total residence time for the sheet in the marking engine and second sheet buffer.

2. The printing system of claim 1, wherein the marking engine exhibits variability in a residence time of a sheet in the marking engine, and wherein the printing system further comprises a buffer control unit which controls the second sheet buffer to absorb the variability.

3. The printing system of claim 2, wherein the buffer control unit variably controls a residence time of each sheet in the second sheet buffer, whereby the sheet exits the second sheet buffer at a predetermined time.

4. The printing system of claim 3, wherein the predetermined time is relative to a time at which the sheet entered the marking engine.

5. The printing system of claim 3, wherein the predetermined time is determined by the central controller.

6. The printing system of claim 2, further comprising a sensor positioned to detect a time at which a sheet of print media is output from the marking engine, the buffer control unit variably controlling the residence time of each sheet in the second sheet buffer based on the detected output time.

7. The printing system of claim 2, further comprising a sensor positioned to detect a time at which a sheet of print media enters the marking engine, the buffer control unit variably controlling the residence time of each sheet in the second sheet buffer based on the detected entry time.

8. The printing system of claim 2, wherein the variability is less than about ±20% of a nominal print time of the marking engine.

9. The printing system of claim 2, wherein the buffer control unit reduces the uncertainty in the output times of printed sheets at the downstream end of the second sheet buffer by at least half as compared with no second sheet buffer.

10. The system of claim 2, wherein the second sheet buffer comprises a pinch nip comprising opposed rollers for gripping a sheet in a closed position, at least one of the rollers being under the control of the buffer control unit for adjusting a gap between the rollers.

11. The printing system of claim 1, further comprising a second marking engine downstream of the first marking engine, and wherein the second sheet buffer is intermediate the first and second marking engines.

12. The printing system of claim 1, further comprising a second marking engine upstream of the first marking engine, and wherein the first sheet buffer is intermediate the first and second marking engines.

13. The printing system of claim 1, further comprising at least one sheet feeder, the conveyor system conveying the sheets of print media from the sheet feeder along the paper path to the marking engine via the first sheet buffer.

14. The printing system of claim 13, wherein the sheet feeder, conveyor system, and finisher are all under the control of a central controller.

15. A method of printing comprising:

transporting sheets of print media on a paper path to a marking engine;

marking the sheets in the marking engine;

outputting the marked sheets from the marking engine to a sheet buffer in the paper path downstream of the marking engine;

establishing a fixed total residence time for the marking engine and sheet buffer which is at least the sum of a maximum residence time for the marking engine, allowing for its variability, and a minimum residence time for the sheet buffer; and controlling a residence time of each sheet in the sheet buffer to absorb variability in a residence time of the sheet in the marking engine, the controlling including controlling the residence time of each sheet in the sheet buffer to achieve the fixed total residence time.

16. The method claim 15, further comprising obtaining a set of residence times of sheets in the marking engine, determining a mean of the residence times and a standard deviation from the mean, and computing the maximum residence time for the marking engine as a function of the mean of the residence times and the standard deviation from the mean.

17. A non-transitory computer program product encoding instructions, which when executed by a computer, perform the method of claim 15.

18. The method of claim 15, further comprising detecting a time at which each sheet is output from the marking engine and wherein the controlling includes determining a residence time based on the detected time.

19. The method of claim 18, further comprising, when the marking engine temporarily goes offline, temporarily storing a plurality of sheets to be marked by the marking engine in a multisheet buffer upstream of the marking engine.

20. A printing system comprising:

a marking engine having a residence time with a known variability;

a paper path which carries sheets of print media to the marking engine from an upstream direction and carries sheets of print media which have been marked by the marking engine in a downstream direction;

a sheet buffer in the paper path downstream of the marking engine; and a buffer control unit which controls the sheet buffer whereby a residence time of each sheet in the sheet buffer is controlled to absorb the variability in the residence time of the sheet in the marking engine, the buffer control unit controlling the residence time of each sheet in the sheet buffer to achieve a fixed total residence time for the marking engine and sheet buffer which is at least the sum of a maximum residence time for the marking engine, allowing for its variability, and a minimum residence time for the sheet buffer.

21. The printing system of claim 20, wherein the printing system comprises an upstream sheet buffer in the paper path upstream of the first marking engine from which sheets are transferred to the first marking engine.

22. The printing system of claim 21, wherein the first sheet buffer comprises a multisheet buffer.

23. The system of claim 20, further comprising a conveyor system which conveys the sheets of print media from the first sheet buffer along the paper path to the marking engine and conveys the same sheets from the marking engine to the second sheet buffer.

24. The system of claim 23, further comprising a finisher in the paper path downstream of the second sheet buffer, the conveyor system conveying the sheets of print media from the second sheet buffer to the finisher.

* * * * *

UNITED STATES PATENT AND TRADEMARK OFFICE

CERTIFICATE OF CORRECTION

PATENT NO. : 8,169,626 B2
APPLICATION NO. : 12/201377
DATED : May 1, 2012
INVENTOR(S) : Robert M. Lofthus et al.

It is certified that error appears in the above-identified patent and that said Letters Patent is hereby corrected as shown below:

On the cover page, "(73) Assignee: Xerox Corporation, Norwalk, CT (US)", please insert the following for the Assignee:

--Palo Alto Research Center Incorporated, Palo Alto, CA (US)--

Signed and Sealed this
Fourth Day of September, 2012

David J. Kappos
*Director of the United States Patent and Trademark Office*